Patented Oct. 17, 1933

1,931,296

UNITED STATES PATENT OFFICE 1,931,296

FERTILIZER

Charles Peter, Salt Lake City, Utah

No Drawing. Application October 4, 1932
Serial No. 636,187

5 Claims. (Cl. 71—9)

This invention relates to an improved fertilizer and its principal objects are:

*First.*—To provide plant food that is readily available for absorption by growing vegetation.

*Second.*—To provide a plant food which, while readily available to growing vegetation, is still held in the soil in what may be termed a semi-permanent condition, that is to say, a condition in which water from rain or artificial irrigation, shall not dissolve any considerable proportion of the nutritive elements, and carry them deep down into the ground beyond the reach of the plant roots.

*Third.*—In the economic scheme, to conserve the rapidly diminishing supply of phosphate rock.

*Fourth.*—To neutralize acid soils or to stimulate neutral soils.

*Fifth.*—To condition and build up the capillary structure of either heavy or light soils.

*Sixth.*—To open heavy soils and to build up or compact sandy or gravelly soils.

*Seventh.*—To create certain thermic conditions favorable to plant life.

*Eighth.*—To be reasonable in cost and easily applied.

After years of experimenting, I have found that a fertilizer must be more than a mere source of plant nutrition, that is to say, a mere reservoir of nutritive elements capable of furnishing the material which constitutes plant structure. Thus, I have found that a proper conditioning of the soil has a most remarkable effect on the growth of plant life, and that it forms a consideration quite as important as the furnishing of the actual nutritive elements.

As a result, I include in my fertilizer a material which will render the structure of heavy soils open and penetrable, with the apparently paradoxial property of rendering soils too open and friable, more compact, and therefore, retentive of plant nutriment, so that the actual nutritive values of the fertilizer shall be available to the maximum extent under substantially all ordinary soil conditions. Stating it in another way, I provide a balanced nutriment, and then provide the growing conditions which shall render this nutriment available to plant life throughout an extended period of time.

A material which I have found extremely valuable in contributing to the soil the physical properties just outlined, is ordinary coal properly prepared.

From an extensive series of observations, I have learned that the physical conditions of many soils are so improved by an application of properly prepared coal, that the first year of cultivation shows an intensified development of plant organisms growing in such soil. Thereupon, during the following year of cultivation, the chemical composition of the same soil will have undergone a change resulting in increased yield from a repeated planting of similar crops the second year, due to an improved chemical composition of the same soil.

I have found that properly prepared coal not only improves the physical properties of the soil by establishing a favorable capillary structure which promotes the activity of the other elements, but at the same time, itself participates in a series of chemico-biological changes in the soil, which make available to the plants, in digestible form, mineral matter which cannot otherwise be reached. In many instances under my observation, the stimulated development of certain plants has increased the yield of useful products, due to the prepared coal, an average of 20 to 50 per cent.

This fertilizer imparts to the soil the characteristics of a fine grain, rich in structural aggregate, similar to bituminous virgin soil. Such a soil easily absorbs excessive natural precipitation of moisture, and presages a minimum of mechanical cultivation, and hence a minimum use of agricultural machinery. Furthermore, such a soil does not form a sticky mass impenetrable to the atmosphere, when an excess of water is present.

A good example of the preferred constitution of my improved fertilizer appears immediately herebelow, the various quantities being those required for one ton of the finished product:

Rock phosphate---------- 800 pounds, or 8 parts by weight
Coal-------------------- 700 pounds, or 7 parts by weight
Lime-------------------- 200 pounds, or 2 parts by weight
Ammonium sulphate------- 200 pounds, or 2 parts by weight
Salt-------------------- 100 pounds, or 1 part by weight The coal may consist of cannel, lignite, sub-bituminous, bituminous, or anthracite, and the lime may be in the form of calcite, gypsum, alunite or similar substance, while the salt is preferably rock salt containing about 95 per cent NaCl.

The manner of preparing and combining these ingredients, is preferably as follows:

The rock phosphate and lime are ground or pulverized, either together or separately, to pass through a 200-mesh screen, while the coal is ground to pass through a 70-mesh screen. The salt is ground or pulverized to pass through a 200-mesh screen.

One-half the ground or pulverized salt is added to the ground or pulverized phosphate rock and lime, and all the ingredients thoroughly mixed together. The mixture of fine rock phosphate, lime and salt, is roasted at a temperature of from 600 to 800 degrees Fahr. for a period of about forty minutes.

The other half of the ground or pulverized salt is added to the fine coal, and thoroughly mixed therewith. The mixture of fine coal and salt is roasted at a temperature of between 350 and 600 degrees Fahr. for a period of about thirty minutes, or until most of the volatile constituents have been carried off.

After roasting the two separate mixtures as above specified, the two mixtures are combined and thoroughly mixed, together with the ammonium sulphate, the latter being either granulated, or in the form of a solution, as preferred. The fertilizer is now ready for use.

It is to be particularly noted that this fertilizer contains no so-called filler, and that no high heat nor acid is used in its preparation. Therefore, the detrimental and costly procedure which is commonly practiced in the manufacture of other fertilizers is saved, and may be passed on to the consumer in lowered prices.

Users of this fertilizer have found it to be a deterrent to noxious weeds, as well as to harmful bacteria in the soil.

An important feature of my process is that the roasting of the coal is accomplished at a moderate temperature.

As an index for determining the phosphoric acid content in the fertilizer, it is to be observed that the foregoing formula is based on a phosphoric acid content in the rock of about 70 per cent, which represents the maximum ordinarily encountered, but if the phosphoric acid content in the rock is less, I increase the amount of rock phosphate. If the latter is the case, I decrease the amount of coal and the amount of lime substantially in inverse proportion to the phosphoric acid content in the rock.

Attention is called to the fact that I have obtained certain favorable results by omitting the roasting of the rock phosphate, coal, lime and salt, but roasting as hereinbefore specified, greatly increases the efficiency of the compound.

Another example of actual compounding and processing of my fertilizer appears following:

| | Per cent by weight |
|---|---|
| Phosphate rock | 50 |
| Coal | 30 |
| Rock salt | 5 |
| Lime rock | 5 |
| Ammonium sulphate | 10 |

The phosphate rock is first ground to pass through a 120-mesh screen and then thoroughly mixed with one-half the salt, and roasted for about 40 minutes in a temperature of 800 degrees Fahr.

The coal is ground to pass through a 40-mesh screen and after thoroughly mixing with one-half the salt, it is heated for 30 to 35 minutes at a temperature of 350 to 385 degrees Fahr.

The rock salt and lime rock are both crushed to pass through a 120-mesh screen.

After the phosphate rock and coal cool, these two products along with the ground lime rock and ammonium sulphate, are thoroughly mixed. This mixture is the finished product.

In the present fertilizer, coal that has been roasted at a moderate heat, when mixed with rock phosphate, causes the latter to disintegrate more rapidly than otherwise, thereby making the phosphoric acid more quickly available. At the same time, roasting the rock phosphate, splits up the crystalline structure thereof, thus giving freer access to the chemical action of the roasted coal.

Roasted gypsum (lime) has itself the effect of speeding up the disintegration of rock phosphate, but in addition, it has the effect of intensifying the aforementioned chemical action of the roasted coal.

On the other hand, ammonium sulphate in the compound, exerts a more immediate effect in bringing about the conversion of tri-calcium phosphate into mono-calcium phosphate than either coal or gypsum, or both coal and gypsum.

Thus, the compound possesses the desirable quality of rendering the phosphoric acid locked up in rock phosphate, progressively, and largely in a cumulative manner, available for absorption by plant organisms.

In both the preliminary mixtures, that is to say, those of phosphate rock, lime rock and salt, in the first place, and coal and salt in the second place, the salt during the roasting operations, acts in the capacity of a flux.

The present application is a substitute for and a continuation in part of one filed by me February 23, 1932, Serial Number 594,748, the said former application having been formally abandoned.

Having fully described my invention, what I claim is:

1. A fertilizing compound, comprising the ingredients and approximately the proportions thereof by weight, as follows:

| | Parts |
|---|---|
| Rock phosphate | 8 |
| Coal | 7 |
| Lime | 2 |
| Ammonium sulphate | 2 |
| Salt | 1 |

2. The process of compounding a fertilizer, consisting in mixing together fine rock phosphate, fine lime rock and fine salt; mixing together fine coal and fine salt; and finally combining the two said mixtures and mixing with ammonium sulphate.

3. The process of compounding a fertilizer, consisting in mixing together fine rock phosphate, fine lime rock and fine salt, roasting said mixture at a temperature between 600 and 800 degrees Fahr. for a period of about 30 minutes; mixing together fine coal and fine salt, roasting this mixture at a temperature between 350 and 600 degrees for a period of about thirty minutes; and finally combining the two said mixtures and mixing with ammonium sulphate.

4. The process of compounding a fertilizer, consisting in mixing together fine rock phosphate, fine lime rock and fine salt, exposing said mixture to a moderate heat; mixing together fine coal and fine salt, exposing this mixture to a lower heat than that just mentioned, and finally combining the two said mixtures and mixing same with ammonium sulphate.

5. The process of compounding a fertilizer, consisting in grinding together rock phosphate and lime rock: adding salt to the ground phosphate and lime rock; roasting said mixture at a moderate temperature; grinding coal and salt together; roasting the mixture of coal and salt at a temperature less than that first mentioned; cooling the two said mixtures; and finally combining the two cooled mixtures and mixing same with ammonium sulphate.

CHARLES PETER.